United States Patent [19]

Yano et al.

[11] 4,157,404

[45] Jun. 5, 1979

[54] PROCESS FOR OBTAINING YOLK LECITHIN FROM RAW EGG YOLK

[75] Inventors: Nobumitsu Yano; Itaru Fukinbara, both of Tokyo; Mitsuo Takano, Imabari, all of Japan

[73] Assignee: Asahi Kasei Kogyo Kabushiki Kaisha, Osaka, Japan

[21] Appl. No.: 928,979

[22] Filed: Jul. 28, 1978

[51] Int. Cl.$^2$ ............................................. A23L 1/28
[52] U.S. Cl. .................................... 426/429; 426/471; 426/472; 426/490; 426/614
[58] Field of Search ............... 426/429, 614, 480, 490, 426/471, 472

[56] References Cited

U.S. PATENT DOCUMENTS

| | | | |
|---|---|---|---|
| 864,219 | 8/1907 | Worner | 426/429 X |
| 2,013,804 | 9/1935 | Klein et al. | 426/429 X |
| 3,795,750 | 3/1974 | Levine | 426/429 X |

FOREIGN PATENT DOCUMENTS 244528  5/1963  Australia .................................. 426/429

*Primary Examiner*—Marc L. Caroff
*Attorney, Agent, or Firm*—Frishauf, Holtz, Goodman & Woodward

[57] ABSTRACT

A process for obtaining yolk lecithin from a raw egg yolk which comprises subjecting a raw egg yolk to extraction with liquid dimethyl ether to obtain an extract and dehydrating the extract to an extent that the water content is not more than 20% by weight, whereby a lecithin-rich fraction is obtained as a separate phase from a neutral lipids-fraction. The isolated lecithin-rich fraction may further be subjected to a second-stage dehydration to give a product in which the lecithin content is as high as 50 to 85% by weight and the water content is very small, for example, below 2 to nearly 0% by weight. By the process of the present invention, there can be obtained a high quality lecithin in high yield.

7 Claims, 1 Drawing Figure

FIGURE
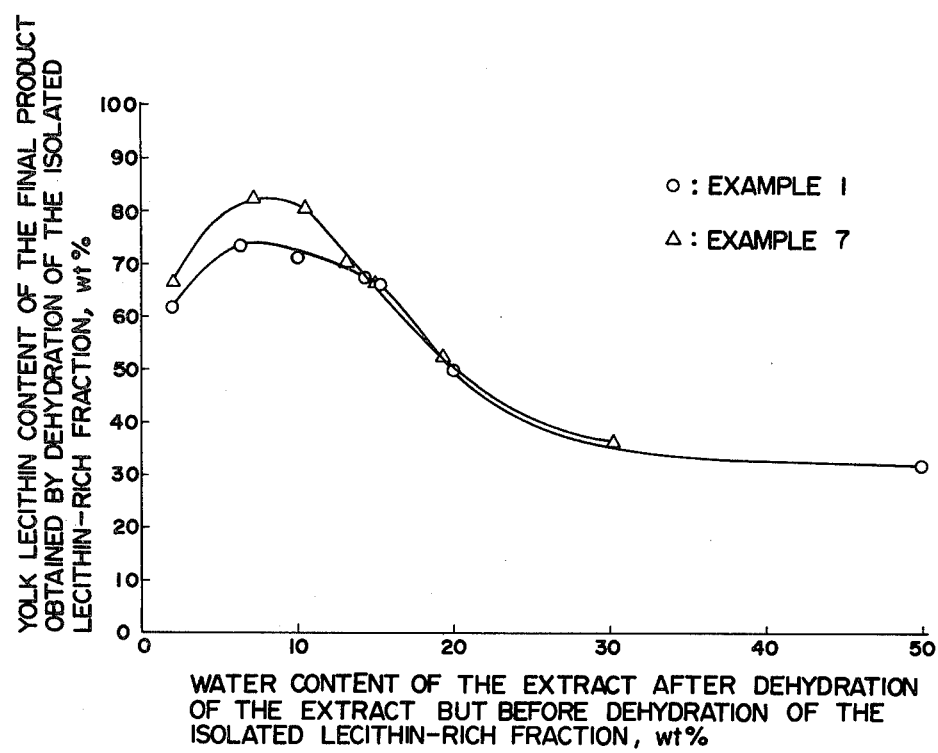

PROCESS FOR OBTAINING YOLK LECITHIN FROM RAW EGG YOLK

The present invention relates to a process for obtaining yolk lecitlhin, and more particularly to a process for effectively obtaining yolk lecithin from a raw yolk by subjecting the raw yolk to extraction with liquid dimethyl ether and subsequently subjecting the resulting extract to vacuum condensation so that the water content of the extract is not more than 20% by weight, whereby a lecithin-rich fraction is produced as a separate phase from a neutral lipids-rich fraction.

A raw yolk, in general, comprises water, yolk proteins and egg lipids. The egg lipids comprises neutral lipids and yolk lecithin, so in order to obtain yolk lecithin it is generally necessary to selectively obtain the egg lipids containing the desired yolk lecithin from an egg yolk. The conventionally proposed methods for obtaining egg lipids are classified into two kinds of methods, namely a scorching method and a solvent extraction method.

The scorching method comprises directly scorching a raw yolk to selectively obtain egg lipids. The scorching method, however, has various disadvantages. For example, the yolk proteins are lost during the course of scorching, and since the yolk is unavoidably exposed to air at elevated temperatures, the obtained egg lipids are extremely deteriorated. Further, it is noted that a large amount of egg lipids remains adhering to the residue. Therefore the efficiency of the scorching method is extremely poor. For these reasons, the scorching method has scarcely been practically employed.

On the other hand, in the solvent extraction method, when a raw yolk as such is used as the starting material, it has been hardly possible, by the use of a single solvent, to effectively extract egg lipids containing the desired yolk lecithin from the raw yolk, since in the natural state a raw yolk is present in the form of a stable emulsion composed, for example, of about 49.5% by weight of water, about 16.1% by weight of yolk proteins and about 32.5% by weight of egg lipids, the balance being substantially ash contents. Illustratively stated, polar solvents such as methanol and acetone are capable of destroying the emulsion of raw yolk to extract and remove water therefrom but these polar solvents are extremely poor in the extraction ability for egg lipids. Accordingly, such polar solvents are incapable of effectively extracting lecithin from the yolk. Non-polar solvents such as ethyl ether, hexane and trichloroethylene are hydrophobic, and therefore cannot extract and remove water from a raw yolk. It is further to be noted that such non-polar solvents are incapable of sufficiently destroying the emulsion of raw yolk, but rather the solvent cooperates with the raw yolk to form a one-phase emulsion. Thus, with such non-polar solvents, it is impossible to effectively obtain egg lipids containing the desired yolk lecithin from the raw yolk by extraction.

In the current method industrially practiced for solvent extraction of lecithin from a yolk, there is employed as the starting material a dried yolk obtained by drying a raw yolk with heated air. The dried yolk is subjected to extraction with a solvent mixture of a polar solvent such as methanol or acetone and a non-polar solvent such as chloroform, diethyl ether or trichloroethylene. In this method, since the solvent mixture contains two different kinds of component solvents, the procedures for the recovery of the component solvents are complicated and cannot be conducted economically. Further, the solvents used have boiling points of 35° C. or more and hence, for complete removal of these solvents from the extract, it is required to heat the extract at high temperatures by the use of steam or to subject the extract to heat treatment at high temperatures for a prolonged period of time under reduced pressure. Yolk lecithin is extremely susceptible to oxidation and therefore, when the yolk lecithin is heat-treated at a temperature as high as 60° C. or more under atmospheric pressure, the color of yolk lecithin changes from yellowish orange to brown through yellowish brown. Accordingly, the quality of the yolk lecithin obtained through the heat treatment for the removal of the solvents is extremely poor. The yolk lecithin produced by such conventional solvent extraction methods has bad smells of oxidized lipids and amines and is colored brown. Yolk lecithin has a wide variey of uses and, for example, it can advantageously be used as an additive for cosmetics such as shampoos, hair dressing agents and nourishing creams, and foodstuffs such as mayonnaise, and spongecake and other confectionary. But, such poor quality lecithin produced by conventional methods is restricted in field of use as well as amount to be used.

As a result of researches of the present inventors, it was found that liquid dimethyl ether is capable of effectively extracting egg lipids containing the desired yolk lecithin from a raw egg yolk.

In order to demonstrate the excellent extraction abilities of liquid dimethyl ether for extraction of egg lipids from a raw yolk, experiments were carried out using methanol, acetone, hexane and liquid dimethyl ether as the extraction solvent. The method and results are shown in the following Experiment 1.

EXPERIMENT 1

To 50 g of a raw yolk of hen egg (the yolk contained 50.3% by weight of water, 31.4% by weight of egg lipids and 16.3% by weight of proteins, the balance being substantially ash contents) were added 150 g of a solvent to obtain a mixture of the raw yolk and the solvent. Using methanol, acetone, hexane and liquid dimethyl ether as the solvents, there were obtained four different kinds of extraction mixtures. Each of these mixtures were charged in a 1 liter glass autoclave having a stirrer, and extraction was effected, while stirring, at 20° C. for 30 minutes. The extraction mixture was subjected to filtration using a cotton filter to separate yolk proteins as the filtration residue. From the obtained filtrate the solvent and water were removed by evaporation using a vacuum condenser (at 30° C. and under 20 mmHg) to obtain a dried extract of which the water content is nearly zero. The quantity of the dried extract was defined as "total lipid". The lecithin content of the dried extract (total lipid) was measured in accordance with the method as described in "Tsuchiya, Tomotaro, Kijun Yushi Bunseki-ho, 2.2.8.3.-71 Rhinshishitsu(Aseton-ho), Shadan-hojin Nihon Yukagaku Kyokai, 1972" (Tomotaro Tsuchiya, Standard Analysis Method for Fats and Oils, Item 2.2.8.3.-71 phospholipid (acetone method), published by Japan Oil Chemistry Association in 1972) in which the lecithin content was determined as the acetone-insoluble matter. The value obtained by subtracting the lecithin content from the total lipid, was defined as the content of neutral lipids.

Results are shown in Table 1.

Table 1

| Solvent | Total lipid, g | Content of lecithin, g | Content of neutral lipids, g |
| --- | --- | --- | --- |
| Liquid dimethyl ether | 12.0 | 4.0 | 8.0 |
| Methanol | 3.7 | 2.9 | 0.8 |
| Acetone | 7.9 | 1.7 | 6.2 |
| Hexane | 1.4 | 0.6 | 0.8 |

As is apparent from Table 1, the extraction abilities of methanol, acetone and hexane for egg lipids are extremely poor as compared with that of liquid dimethyl ether.

Further, the following Experiment 2 was conducted to show the influences of the liquid dimethyl ether—extraction on the qualities of the desired lecithin—containing egg lipids.

EXPERIMENT 2

150 g of a raw yolk of hen egg (the yolk contained 50.3% by weight of water, 31.4% by weight of egg lipids, 16.3% by weight of proteins and 2.0% by weight of ash) were charged into a 1 liter autoclave having a stirrer, and 525 g of liquid dimethyl ether were introduced under pressure. A first extraction was conducted at 30° C. for 15 minutes under a pressure of 5.9 kg/cm$^2$G. The portion containing yolk proteins was separated from the dimethyl ether solution of extract by filtration using a cotton filter. The portion containing yolk proteins was subjected to a second extraction with 150 g of liquid dimethyl ether and to a filtration—separation of crude yolk proteins in the same manner as described above, thereby to obtain a dimethyl ether solution. The dimethyl ether solutions obtained by the first and second extractions were combined. From the combined dimethyl ether solution, the dimethyl ether was removed by evaporation under atmospheric pressure to obtain 85 g of extract. The extract was subjected to freeze-drying to obtain 42 g of egg lipids which had a natural yolk color (Gardner No. 11.0) and a natural yolk odor. On the other hand, the crude yolk proteins obtained by filtration—separation were allowed to stand at 20° C. under 20 mmHg for 60 minutes to evaporate the remaining dimethyl ether, thus giving 60 g of yolk proteins. The resulting yolk proteins had a cholesterol content of 0.8 mg/g on a dry basis, and this means that 97% of the cholesterol originally contained in the raw yolk was removed. The obtained yolk proteins was examined according to A.O.C.S. Official Method Ba 11-65 and found to have a nitrogen solubility index (N.S.I.) of 78. This fact shows that the yolk proteins were not denaturated. A comparison of the thus obtained egg lipids and the egg lipids manufactured and sold by Viovin Corporation, U.S.A. and commercially available in the name of "Egg Oil" was made, and results are summarized in Table 2.

Table 2

| | Egg lipids | |
| --- | --- | --- |
| | Obtained by liquid dimethyl ether extraction | Manufactured and sold by Viovin Corporation, U.S.A. |
| Lecithin content*, % | 30.6 | 23.8 |
| Iodine value | 63.9 | 71.7 |
| Saponification value | 203.5 | 199.7 |
| Peroxide value | 0.3 | 9.3 |
| Acid value | 7.5 | 10.4 |
| Color, Gardner No. | 11.0 | 18.0 |
| Odor | Fresh yolk | Strong odor of amines |

*Measured according to the above-mentioned method as described in Tomotaro Tsuchiya, Standard Analysis Method for Fats and Oils, Item 2.2.8.3-71 phospholipid (acetone method), published by Japan Oil Chemistry Association in 1972.

As is apparent from Table 2, by the extraction using liquid dimethyl ether, the egg lipids can be effectively obtained without denaturation thereof.

In the raw yolk, yolk proteins and yolk lecithin are bonded together by a hydrogen bond and a bond due to van der Waals' force to form a stable O/W type emulsion in which the neutral lipids serve as nuclei. Therefore, in order to effectively obtain yolk lecithin from a raw yolk by a solvent extraction method, the solvent to be used in the extraction should have a capacity of not only cleaving these bonds to liberate the lecithin but also dissolving thereinto the liberated lecithin.

Dimethyl ether has a molecular weight of 46 and a diameter across the molecule as smaller as 5 Å. Though dimethyl ether is an ether, it has a weak polarity and a mutual solubility of water. For example, at 20° C., 54 g of dimethyl ether can be dissolved in 100 g of water and 6.3 g of water can be dissolved in 100 g of dimethyl ether. Because of its small diameter and specific properties, dimethyl ether is capable of easily permeating into the natural product substances as compared with other organic solvents. Further, it is noted that when the liquid dimethyl ether is employed for the extraction of yolk lecithin from a raw yolk, the bonds between the yolk lecithin and the yolk proteins are effectively cloven due to the mutual solubility between the liquid dimethyl ether and the water present in the raw yolk to liberate the lecithin into the obtained extraction mixture. Such excellent performance cannot be attained by any other solvents or mixtures thereof. In addition, it is noted that the extraction of a raw yolk with liquid dimethyl ether gives, as the extraction residue, excellent quality yolk proteins which are not only free of egg lipids and cholesterol but also have not undergone denaturation.

Dimethyl ether has a boiling point as low as −24.9° C., and is gaseous under standard atmospheric conditions. It can be readily liquefied by cooling to below about −25° C. at atmospheric pressure or by compression to above about 5 to 6 kg/cm$^2$G at room temperature. Therefore, after the extraction with the thus liquefied dimethyl ether, the dimethyl ether can be easily removed and recovered by evaporation at room temperature and atmospheric pressure. The recovery and removal of the extract and dimethyl ether used as the extractant can be easily conducted without using high temperature conditions, so that the process can advantageously be carried out without causing the desired yolk lecithin and the yolk proteins to be denaturated. Even when the dimethyl ether remains in the extract in an amount as small as a trace, it can be easily, completely removed by elevating the temperature slightly, e.g., to about 50° C. for a short period of time or by reducing the pressure, for example by treating the extract at 20° C. under a pressure of 20 mmHg for 120 minutes.

As described, when the raw yolk is subjected to extraction with liquid dimethyl ether, the desired yolk lecithin can be effectively extracted together with neutral lipids and water, without causing denaturation of the lecithin as well as the yolk proteins.

Based on the excellent extraction capacity of liquid dimethyl ether for egg lipids containing the desired lecithin, we have made extensive and intensive researches, with a view to developing a new process for effectively obtaining high quality lecithin from a raw yolk by a solvent extraction method. As a result, it has been found that when the extract containing lecithin, neutral lipids and water, which extract is obtained in high yield by an extraction process comprising contacting a raw yolk with liquid dimethyl ether and removing yolk proteins from the resulting extraction mixture, followed by removal of the liquid dimethyl ether by evaporation, is subjected to vacuum condensation to reduce the water content so that the water content is not more than 20% by weight based on the extract, the extract is caused to separate into two distinct fractions, namely a lecithin-rich fraction and a neutral lipids-rich fraction.

It is an object of the present invention to provide a process for effectively obtaining yolk lecithin from a raw yolk by an extraction method using liquid dimethyl ether.

It is another object of the present invention to provide a process of the kind described above, in which the yolk lecithin can be obtained in high yield without denaturation thereof, and at the same time the yolk proteins are also recovered without undergoing any denaturation.

It is still another object of the present invention to provide a process of the character described, in which the dimethyl ether can be recovered with high efficiency and reused with great advantages.

It is a further object of the present invention to provide a process as mentioned above, which can be easily, simply carried out.

The foregoing and other objects, features and advantages of the present invention will be apparent to those skilled in the art from the following detailed description, the appended claims and the accompanying drawing in which:

FIGURE is a graph showing the relationship between the water content of the extract after dehydration of the extract but before dehydration of the isolated lecithin-rich fraction and the yolk lecithin content (on a water-free basis) of the final product obtained by dehydration of the isolated lecithin-rich fraction.

Essentially according to the present invention, there is provided a process for obtaining yolk lecithin from a raw yolk which comprises subjecting a raw yolk to extraction with liquid dimethyl ether, the weight ratio of liquid dimethyl ether to raw yolk being not less than 2:1, followed by separation of the yolk proteins contained in the extraction mixture and removal of the liquid dimethyl ether, to obtain an extract comprising lecithin, neutral lipids and water; and dehydrating the extract so that the water content of the extract is not more than 20% by weight, thereby causing the extract to separate into a lecithin-rich fraction and a neutral lipids-rich fraction followed by isolation of the lecithin-rich fraction.

The extract obtained through the extraction with liquid dimethyl ether is an emulsion of a three-component system composed of yolk lecithin, neutral lipids and water, and the content of neutral lipids is larger than that of lecithin. In general, the weight ratio of the lecithin content to the content of neutral lipids is about 30:70. According to the process of the present invention, when the extract is subjected to dehydration to an extent that the water content of the extract is not more than 20% by weight, the extract is surprisingly caused to separate into two distinct fractions, namely, a lecithin-rich fraction and a neutral lipids-rich fraction. The thus separated lecithin-rich fraction comprises lecithin, neutral lipids and water but it is rich in lecithin as compared with the above-mentioned extract as such, that is, the weight ratio of the lecithin content to the content of neutral lipids is about 50:50 to about 85:15. On the other hand, the separated neutral lipids-rich fraction comprises neutral lipids and very small amounts of lecithin and water.

In another aspect of the present invention, the lecithin-rich fraction may further be subject to a second-stage dehydration to remove water, thereby enabling the water content of the product to be further decreased. Only by this second-stage dehydration, the water content of the final product can be reduced to an extent as low as below 2% by weight, whereby the quality of the product can be improved.

In practicing the present invention, the source of a raw egg yolk is not critical, but from the viewpoint of availability, there may usually be used raw yolks of hen egg, quail egg, duck egg and the like. The raw yolk as such may be employed. A frozen yolk and a refrigerated yolk may also be employed.

The extraction procedures using liquid dimethyl ether can be conducted, requiring no complicated operation and apparatus. Illustratively stated, the extraction may be conducted by containing a raw yolk with liquid dimethyl ether, using a method as ordinarily employed in the extraction process, for example batchwise method with stirring, column extraction method, under such conditions that the dimethyl ether is maintained to be liquid (e.g., at room temperature under 5 to 6 kg/cm$^2$G, or at below $-25°$ C. and atmospheric pressure).

The amount of liquid dimethyl ether to be employed in the extraction involved in the process of the present invention may slightly vary depending on the temperature employed, but may generally be such that the weight ratio of liquid dimethyl ether to raw yolk is not less than 2:1. The quantity of water which is extracted together with neutral lipids and lecithin is approximately equal to the amount of saturation solubility of water for the liquid dimethyl ether at the temperature employed. Therefore, in order to not only attain good extraction efficiency of egg lipids containing the desired lecithin but also to facilitate the subsequent dehydrating operation, the weight ratio of liquid dimethyl ether to raw yolk may advantageously be in the range of 2:1 to 5:1.

After the extraction operation is completed to obtain an extraction mixture, the dimethyl ether solution of the extract containing neutral lipids, yolk lecithin and water is separated from the yolk proteins produced as the extraction residue, using a suitable means such as a filter, centrifugal separator, siphon or the like. If desired, the yolk proteins produced as the extraction residue may further be subjected to extraction with liquid dimethyl ether so that the yolk lecithin remaining unextracted can be advantageously recovered.

From the dimethyl ether solution is removed the liquid dimethyl ether by evaporation as described before, thereby to obtain an extract comprising neutral lipids, yolk lecithin and water.

The thus obtained extract is then subjected to dehydration so that the water content is not more than 20% by weight.

The content of water is the extract obtained directly from the extraction varies depending on the amount of liquid dimethyl ether used. For example, when the extraction is conducted using 5 parts by weight of liquid dimethyl ether per 1 part by weight of raw yolk and the dimethyl ether is then removed from the demethyl ether solution, the content of water in the extract is 50% by weight. The thus obtained extract comprises water, neutral lipids and lecithin. As the extract is condensed by dehydration under reduced pressure, the emulsion constituting the extract is gradually destroyed and the neutral lipids start to be concentrated into the upper layer of the condensed extract, and the content of lecithin in the lower layer of the condensed extract is caused to increase, resulting in separation of the extract into two distinct fractions, namely, a lecithin-rich fraction and a neutral lipids-rich fraction. As described above, the dehydration in this stage may be effected by vacuum condensation. the pressure for the vacuum condensation may be about 100 mmHg or lower, more preferably about 10 to 30 mmHg. The temperature may be 50° C. or lower, more preferably 30 to 40° C. At temperatures in this range, change of color to brown can be completely avoided. In this stage, the dehydration of the extract by vacuum condensation is effected to an extent that the water content of the extract is not more than 20% by weight, more preferably 20 to 2% by weight. Taking as an example the case where in the extraction the weight ratio of liquid dimethyl ether to raw yolk is 5, the amount of water removed by this dehydration step is 60 to 80% by weight of the water contained in the extract. After the dehydration by vacuum condensation, there is obtained a lecithin-rich fraction (average composition: 35.8% by weight of yolk lecithin, 19.2% by weight of neutral lipids and 45.0% by weight of water) as a separate phase from a neutral lipids-rich fraction (average composition: 96.2% by weight of neutral lipids, 3.5% by weight of yolk lecithin and 0.3% by weight of water). If the content of water in the extract is excessively reduced, i.e., to less than 2% by weight based on the extract, the lecithin tends to dissolve into the neutral lipids, thus disadvantageously leading to decrease in the yield of lecithin as well as reduction in the content of lecithin in the final product.

As described, according to another aspect of the present invention, the lecithin-rich fraction obtained by the first-stage dehydration as mentioned above may further be subjected to a second-stage dehydration to remove water. By this second-stage dehydration, the water content of the product can be reduced to an extent as low as below 2% by weight. Thus, there can be obtained a high quality product in which the lecithin content is as high as about 50 to about 85% by weight on a water-free basis and the water content is as low as below 2% by weight to nearly 0% by weight. The term "the lecithin content on a water-free basis" as used herein is intended to mean the lecithin content based on the total amount of lecithin and neutral lipids (exclusive of water) contained in the product. The second dehydration may be effected by either freeze-drying or vacuum drying. The former drying method is advantageous when the water content of the lecithin-rich fraction is about 10% by weight or less, while the latter drying method is advantageous when the water content is more than 10% by weight. In the second dehydration step, the drying may be effected at not higher than 30° C. under a pressure of 0.05 to 0.5 mmHg.

As is apparent from the description, according to the present invention, the yolk lecithin can be effectively extraction-separated from a raw yolk and there can be obtained a product having a high lecithin content without denaturation of the lecithin in color and odor.

This invention will be more fully illustrated by the following examples, but they are not construed to be limiting the scope of the present invention.

Througout the specification including Examples, the lecithin content is determined according to the method as described in "Tsuchiya, Tomotaro, Kijun Yushin Bunseki-ho, 2.2.8.3-71 Rinshishitsu(Aseton-ho), Shadan-hojin Nihon Yukagaku Kyokai, 1972" (Tomotaro Tsuchiya, Standard Analysis Method for Fats and Oils, Item 2.2.8.3.-71 phospholipid (acetone method), published by Japan Oil Chemistry Association in 1972).

EXAMPLE 1

100 g of a raw yolk of hen egg (the yolk contained 50.3% by weight of water, 31.4% by weight of egg lipids, 16.3% by weight of proteins and 2.0% by weight of ash) were charged into a 1 liter autoclave having a stirrer, and 500 g of liquid dimethyl ether were introduced at room temperature under pressure. Extraction was carried out at 20° C. under a pressure of 4.2 kg/cm$^2$G for 15 minutes while stirring. The dimethyl ether solution of the extract was separated from the portion containing yolk proteins by filtration using a cotton filter. From the dimethyl ether solution, the dimethyl ether was evaporated to obtain 48 g of an extract from the yolk. The same procedures as described above were repeated 7 times to obtain 336 g in total of the extract. 7 sample extracts were prepared by weighing 45 g from the extract. Each of the sample extracts was charged into a 500 ml separable flask adapted for evaporation. The flask was immersed in a water bath kept at 80° C. (the temperature of the extract was 30 to 40° C.) and the internal pressure of the flask was reduced to from 36 to 20 mmHg by means of an ejector attached to the exit mouth of a service water pipe to effect dehydration of the extract. To the 7 sample extracts, as the period for the dehydration of the extract, were allotted 0 minute, 15 minutes, 30 minutes, 45 minutes, 60 minutes, 80 minutes and 120 minutes, respectively. There were obtained condensed extracts each comprising two distinct phases, namely, a neutral lipids-rich fraction and a lecithin-rich fraction. Each (except that of the 0-minute dehydration) of the condensed extracts comprising two phases, was further subjected to centrifugal separation using a precipitation type centrifugal separator under 5,000 G for 10 minutes to obtain a lecithin-rich fraction. The lecithin-rich fraction was subjected to dehydration to obtain a final product containing lecithin. Results are summarized in Table 3.

Table 3

| Dehydration period, minutes | Water content of the extract after dehydration of the extract but before dehydration of the isolated lecithin-rich fraction, wt % | Yolk lecithin content (on a water-free basis) of the final product obtained by dehydration of the isolated lecithin-rich fraction, wt % |
|---|---|---|
| 0 | 49.8 | 32.1* |

Table 3-continued

| Dehydration period, minutes | Water content of the extract after dehydration of the extract but before dehydration of the isolated lecithin-rich fraction, wt % | Yolk lecithin content (on a water-free basis) of the final product obtained by dehydration of the isolated lecithin-rich fraction, wt % |
|---|---|---|
| 15 | 20.0 | 50.0 |
| 30 | 15.2 | 66.5 |
| 45 | 13.6 | 67.5 |
| 60 | 10.1 | 71.5 |
| 80 | 6.3 | 73.9 |
| 120 | 2.0 | 61.9 |

Note
*The value shows the lecithin content of the extract as such (before separation into the two fractions).

The yolk lecithin contents are plotted against the water contents after the first-stage dehydration of the extract to obtain a graph shown in FIGURE of the accompanying drawing.

EXAMPLE 2

150 g of a raw yolk of hen egg (the yolk contained 50.2% by weight of water, 32.3% by weight of egg lipids, 15.6% by weight of proteins and 1.9% by weight of ash) were charged into a 1 liter glass autoclave having a stirrer, a and 450 g of liquid dimethyl ether were introduced under pressure. Extraction was carried out at 30° C. under 5.9 kg/cm$^2$G for 15 minutes while stirring. The dimethyl ether solution of the extract was separated from the egg proteins by filtration using a cotton filter. To the egg proteins obtained as the filtration residue were added 150 g of liquid dimethyl ether and the same extraction as described above was carried out at 30° C. under 5.9 kg/cm$^2$G for 5 minutes to extract egg lipids remaining in the egg proteins. The dimethyl ether solution from the second extraction was separated by filtration using a cotton filter, and this dimethyl ether solution was combined with the dimethyl ether solution obtained in the first extraction. The combined dimethyl ether solution was charged into a 1 liter beaker, and this beaker was immersed into a water bath (which was kept at 25° C.) to evaporate the dimethyl ether. There were obtained 83 g of extract. The extract was subjected to vacuum condensation, using a rotary evaporator, at 30° C. for 60 minutes to remove 28 g of water. The resulting condensed extract consisted of two phases and contained 18.5% by weight of water. The condensed extract was then subjected to centrifugal separation under 5,000 G for 10 minutes to obtain 25 g of a neutral lipids-rich fraction (which constituted an upper layer) and 30 g of a lecithin-rich fraction (which constituted a lower layer). The lecithin-rich fraction was freeze-dried to obtain 20 g of product containing lecithin. The lecithin content of the product was 70.3% by weight on a water-free basis.

EXAMPLE 3

155 g of a raw yolk of hen egg (the yolk had the same composition as described in Example 2) were charged into a 1 liter glass autoclave having a stirrer, and 340 g of liquid dimethyl ether were introduced under pressure. Extraction was carried out at 35° C. under 7.0 kg/cm$^2$G for 5 minutes. The dimethyl ether solution obtained by the extraction in the autoclave was filtered through a cotton filter into another 1 liter autoclave. From the dimethyl ether solution, dimethyl ether was evaporated at 30° C. under 6.0 kg/cm$^2$G, and the evaporated dimethyl ether was recovered by leading it into a pressure bottle cooled to 18° C. through a stainless pressure tube. The quantity of dimethyl ether recovered was 312 g.

The extract left in the autoclave was heated to 30° C. (the temperature of the autoclave was 40° C.) under 10 mmHg to effect vacuum condensation to dehydrate the extract. 60 Minutes thereafter, 53.2 g of condensed extract were found in the autoclave, and the water content of the condensed extract was 17.0% by weight. The condensed extract consisting of two layers was poured into a suction funnel equipped with a filter cloth and a receiver with its pressure reduced to 400 mmHg, thereby to remove a neutral lipids-rich fraction of the two layers as the filtrate. 28.4 g of a lecithin-rich fraction were left on the filter cloth. The lecithin-rich fraction was freeze-dried to obtain 18.5 g of a dry product containing lecithin. The dry product was found to have 2.0% by weight of water and 67.0% by weight (on a water-free basis) of lecithin.

EXAMPLE 4

85 g of a frozen yolk of hen egg (the yolk contained 53.0% by weight of water, 30.5% by weight of egg lipids, 14.5% by weight of proteins and 2.0% by weight of ash) were charged into a 1 liter stainless autoclave, and after the frozen yolk had molten into liquid yolk, 385 g of liquid dimethyl ether were introduced under pressure into the autoclave. Extraction was conducted, with stirring, at 25° C. under 5.0 kg/cm$^2$G for 5 minutes. The resulting dimethyl ether solution of the extract was poured, under atmospheric pressure, into a beaker through the filter cloth put on a metal gauze. While keeping the temperature in the beaker at 20° C., the dimethyl ether was evaporated to give 46.6 g of an extract. The extract was then charged into a 300 ml separable flask and condensed, using an evaporator, at 35° C. (the external temperature of the autoclave was 60° C.) under 15 mmHg for 20 minutes to obtain 29 g of a condensed extract consisting of two layers (which contained 18.8% by weight of water in total). This condensed extract was subjected to centrifugation under 4,000 G for 30 minutes, and the neutral lipids-rich fraction of the two layers was removed by decantation to obtain 18.0 g of a lecithin-rich fraction. The lecithin-rich fraction was freeze-dried to obtain 12.7 g of a product containing 1.2% by weight of water and 72.3% by weight (on a water-free basis) of lecithin.

EXAMPLE 5

300 g of a refrigerated yolk (the yolk contained 54.0% by weight of water, 29.8% by weight of egg lipids, 14.2% by weight of proteins and 2.0% by weight of ash) were charged into a 2 liter autoclave and 750 g of liquid dimethyl ether were introduced under pressure. Extraction was conducted under 2.2 kg/cm$^2$G while keeping the temperature in the autoclave at 5° C. and thoroughly stirring the contents for 30 minutes. The dimethyl ether solution of the extract was separated, and the dimethyl ether was recovered in the same manner as described in Example 3 to obtain 134 g of an extract. The extract was charged into a 300 ml separable flask, and vacuum condensation was conducted, using an evaporator, at 25° C. under 30 mmHg for 130 minutes to remove water. The condensed extract consisting of two layers in the flask were poured into a suction funnel equipped with a filter cloth and a receiver with its pressure reduced to 400 mmHg, thereby to remove a neutral lipids-rich fraction of the two layers as the filtrate. 43.9 g (which contained 11.2% by weight of water) of a lecithin-rich fraction were left on the filter cloth. The lecithin-rich fraction was dried under vacuum to obtain 39.8 g of a product containing 2.1% by weight of water and 73.2% by weight (on a water-free basis) of lecithin.

EXAMPLE 6

100 g of a raw yolk of hen egg (the same raw yolk as used in Example 2) were charged into a 1 liter glass autoclave having a stirrer, and 75 g of liquid dimethyl ether were introduced under pressure. Extraction was carried out by stirring the contents in the autoclave at 5° C. under 2.2 kg/cm$^2$g. The dimethyl ether solution of the extract was taken into a beaker through filtration using a cotton filter. From this dimethyl ether solution, the dimethyl ether was evaporated to obtain 12.6 g of an extract containing 36.0% by weight of water.

Into the residue left in the autoclave and still containing a considerable quantity of egg lipids were introduced 220 g of liquid dimethyl ether under pressure, and extraction was conducted at 5° C. under 2.2 kg/cm$^2$G for 5 minutes while stirring. By this second extraction, 32.0 g of an extract containing 38.0% by weight of water were obtained. The first and second extracts were combined and charged into an egg plant type flask. Vacuum condensation was conducted, using a rotary evaporator, at 31° C. under 15 mmHg for 17 minutes. The condensed extract (32.8 g, which contained 19.0% by weight of water) consisting of two layers was centrifuged at 4,200 rpm for 15 minutes, and 16.0 g of a lecithin-rich fraction was separated. The lecithin-rich fraction was subjected to freeze-drying to obtain 11.0 g of a product containing 2.0% by weight of water and 59.8% by weight (on a water-free basis) of lecithin.

EXAMPLE 7

2.0 kg of a raw yolk of hen egg (the yolk contained 52.5% by weight of water, 30.1% by weight of egg lipids, 15.6% by weight of proteins and 1.8% by weight of ash) were charged into a 15-liter pressure tank, and 5.5 kg of liquid dimethyl ether were introduced under pressure. Extraction was conducted at 28° C. under 5.7 kg/cm$^2$G for 30 minutes while stirring. The dimethyl ether solution of the extract was separated from the proteins by filtration using a filter vessel having thereon a filter cloth having a diameter of 290 mm$\phi$. The dimethyl ether solution was then charged into another pressure tank and was heated to 40° C., and the evaporated dimethyl ether was recovered into a container. 787 g of an extract containing 30.1% by weight of water was obtained. 7 sample extracts were prepared by weighing 100 g from the extract. The sample extracts were subjected to vacuum condensation, using a rotary evaporator, at 40° C. under 10 mmHg for 0, 10, 20, 30, 40, 50 and 80 minutes, respectively. Each (except that of the 0-minute dehydration) of the condensed extracts consisting of two layers was centrifuged at 5,000 rpm for 15 minutes to obtain a lecithin-rich fraction. The lecithin-rich fraction was freeze-dried to obtain a final product containing lecithin. Results are summarized in Table 4.

Table 4

| Dehydration period, minutes | Water content of the extract after dehydration of the extract but before dehydration of the isolated lecithin-rich fraction, wt % | Yolk lecithin content (on a water-free basis) of the final product obtained by dehydration of the isolated lecithin-rich fraction, wt % |
| --- | --- | --- |
| 0 | 30.1 | 36.5* |
| 10 | 19.3 | 52.3 |
| 20 | 15.0 | 66.8 |
| 30 | 13.1 | 70.5 |
| 40 | 10.4 | 80.6 |
| 50 | 7.2 | 82.3 |
| 80 | 2.1 | 66.9 |

Note)
*The value shows the lecithin content of the extract as such (before separation into the two fractions).

The yolk lecithin contents are plotted against the water contents after the first-stage dehydration of the extract to obtain a graph shown in FIGURE of the accompanying drawing.

What is claimed is:

1. A process for obtaining yolk lecithin from raw yolk which comprises subjecting raw yolk to extraction with liquid dimethyl ether thereby forming an extraction mixture, the weight ratio of liquid dimethyl ether to raw yolk being not less than 2:1, followed by separation of yolk proteins from the extraction mixture and removal of the liquid dimethyl ether from the extraction mixture, to obtain an extract comprising lecithin, neutral lipids and water; and dehydrating the extract so that the water content of the extract is not more than 20% by weight, thereby causing the extract to separate into a lecithin-rich fraction and a neutral lipids-rich fraction, followed by isolation of the lecithin-rich fraction.

2. A process according to claim 1, wherein said weight ratio of liquid dimethyl ether to raw yolk is 2:1 to 5:1.

3. A process according to claim 1, wherein the dehydration of the extract is conducted to an extent that the water content of the extract is 20 to 2% by weight.

4. A process according to claim 1, which further comprises subjecting the isolated lecithin-rich fraction to a second-stage dehydration.

5. A process according to any of one of claims 1 to 4, wherein the dehydration of the extract is effected by vacuum condensation.

6. A process according to claim 4, wherein said second-stage dehydration of the isolated lecithin-rich fraction is effected by freeze-drying or vacuum drying.

7. A process according to claim 5, wherein said second-stage dehydration of the isolated lecithin-rich fraction is effected by freeze-drying or vacuum drying.

* * * * *